Feb. 12, 1929.

W. D. WATLING 1,701,740

AMUSEMENT DEVICE

Filed March 10, 1927 7 Sheets-Sheet 2

Fig. 2

Inventor:
William D. Watling.
By Joshua R H Potk
his Attorney.

Witnesses:
C. E. Wessels
J. C. Appleton

Feb. 12, 1929.  
W. D. WATLING  
AMUSEMENT DEVICE  
Filed March 10, 1927  
1,701,740  
7 Sheets-Sheet 3  
Fig. 3

Witnesses:  
E. E. Wessels  
F. C. Appleton

Inventor:  
William D. Watling  
By Joshua R H Polk  
his Attorney.

Feb. 12, 1929.

W. D. WATLING

AMUSEMENT DEVICE

Filed March 10, 1927  7 Sheets-Sheet 4

1,701,740

Witnesses:

Inventor:
William D. Watling,
By Joshua R H ...
his Attorney

Feb. 12, 1929.                    W. D. WATLING                    1,701,740
                                 AMUSEMENT DEVICE
                              Filed March 10, 1927           7 Sheets-Sheet 5

Witnesses:
C. E. Wessels
F. C. Appleton

Inventor:
William D. Watling;
By Joshua R H Potts
   his Attorney.

Feb. 12, 1929.

W. D. WATLING 1,701,740

AMUSEMENT DEVICE

Filed March 10, 1927      7 Sheets-Sheet 6

Witnesses:
C. E. Wessels.
F. C. Appleton

Inventor:
William D. Watling,
By Joshua R H Booth
his Attorney.

Feb. 12, 1929.

W. D. WATLING 1,701,740

AMUSEMENT DEVICE

Filed March 10, 1927 7 Sheets-Sheet 7

Witnesses:
C. E. Weasels
J. C. Appleton

Inventor.
William D. Watling,
By Joshua R. H. Potts
his Attorney.

Patented Feb. 12, 1929.

1,701,740

UNITED STATES PATENT OFFICE.

WILLIAM D. WATLING, OF CHICAGO, ILLINOIS.

AMUSEMENT DEVICE.

Application filed March 10, 1927. Serial No. 174,146.

My invention relates to an amusement device adapted to be used as a fortune telling machine or a racing machine, and the object of my invention is to provide a device of the above indicated character, which is of simplified construction and has means by which a specific question may be selected, and which will be answered upon the operation of the machine.

Other objects will appear hereinafter.

My invention consists in the construction, combination and arrangement of parts hereinafter described and claimed.

My invention will be best understood by reference to the accompanying drawings forming a part of this specification and in which.

Figure 1:
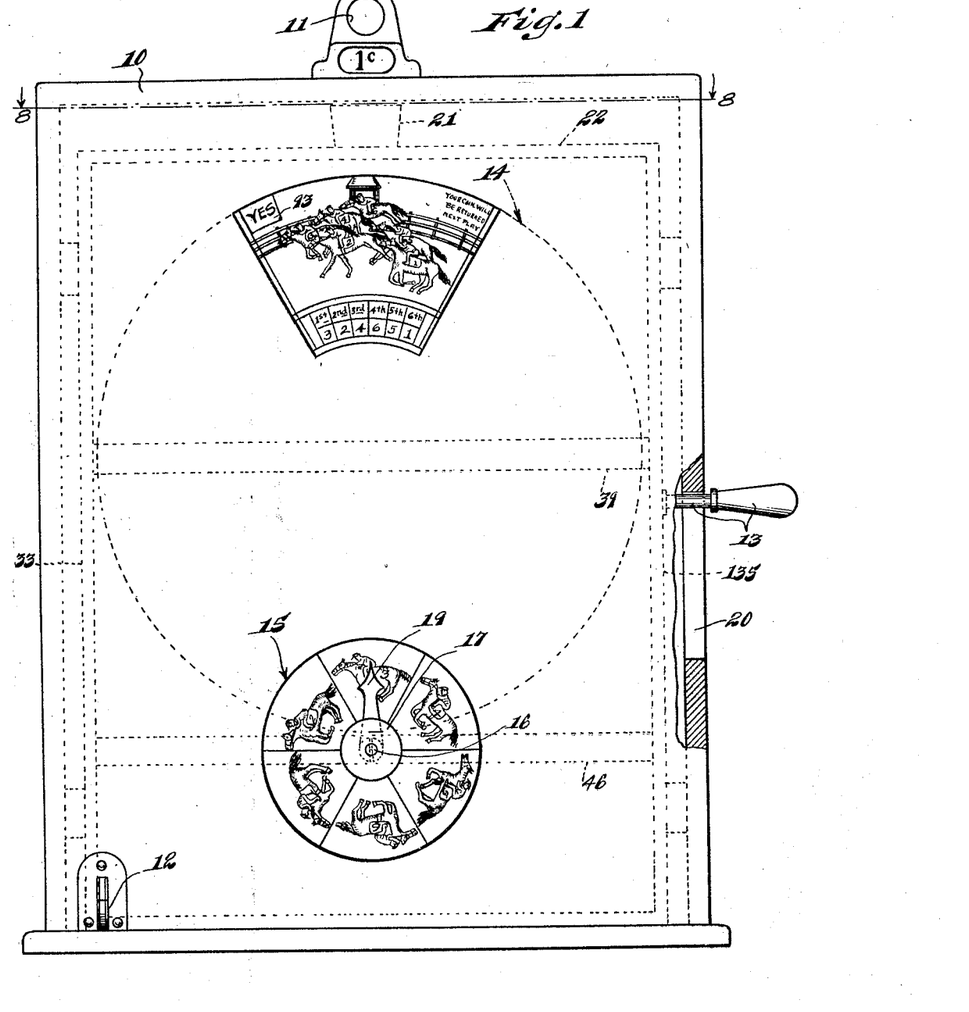
Figure 1 is a front elevational view of an amusement device incorporating my invention.

In the drawings and for the purpose of illustration, I have shown the preferred embodiment of my invention, and in which Figure 10 designates a cabinet in which my amusement device is housed. A coin slot 11 is positioned on the top thereof and a coin return slot 12 at the lower end, as shown in Figure 1. An operating handle 13 is provided on the right side of the cabinet, which may be operated after a coin has been inserted in slot 11.

Figure 6:
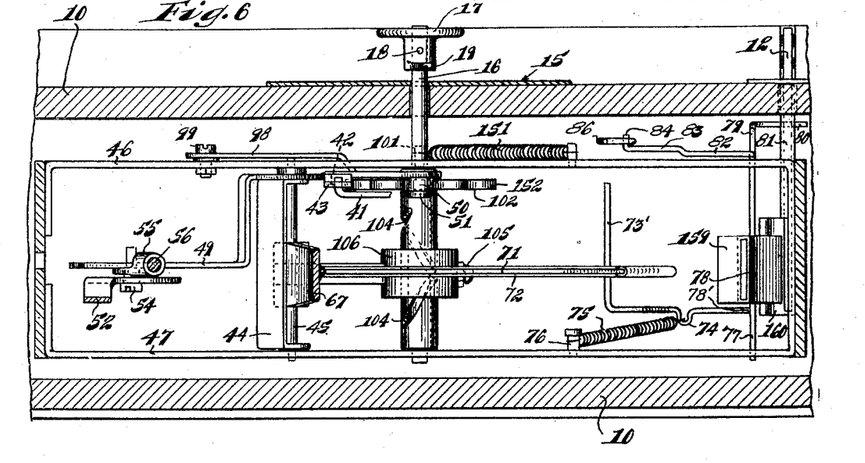
Figure 6 is a cross sectional view taken on approximately the line 6—6 of Figure 3.

Showing through the cabinet 10 is a large dial 14 and near the bottom of Figure 1 is a small dial 15 secured to the front of the cabinet. Extending through the front of the cabinet 10 is a rotatable shaft 16 having a knob 17 secured to the outer end thereof by a suitable pin 18, as shown in Figure 6. Integral with the knob 17 is a pointer 19 which is adapted to point toward one of the objects on the dial 15 when the knob 17 is turned to any desired position.

Figure 11:
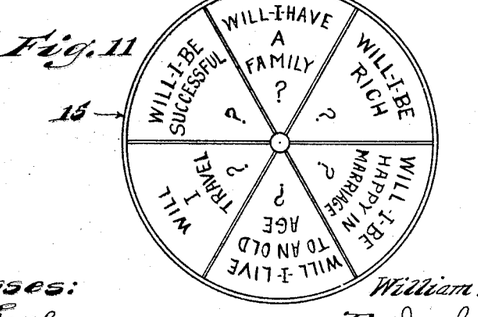
Figure 11 is a view of the reversed side of the small dial shown near the bottom of Figure 1.

Figure 11 shows the reversed side of dial 15 and when the dial as shown in Figure 1 is removed and reversed, the pointer 19 is adapted to be rotated so as to select any one of the questions shown on dial 15 in Figure 11. In the right side of Figure 1 is shown a slot 20 through which the extension of handle 13 is adapted to pass for operating the amusement device.

Figure 3:
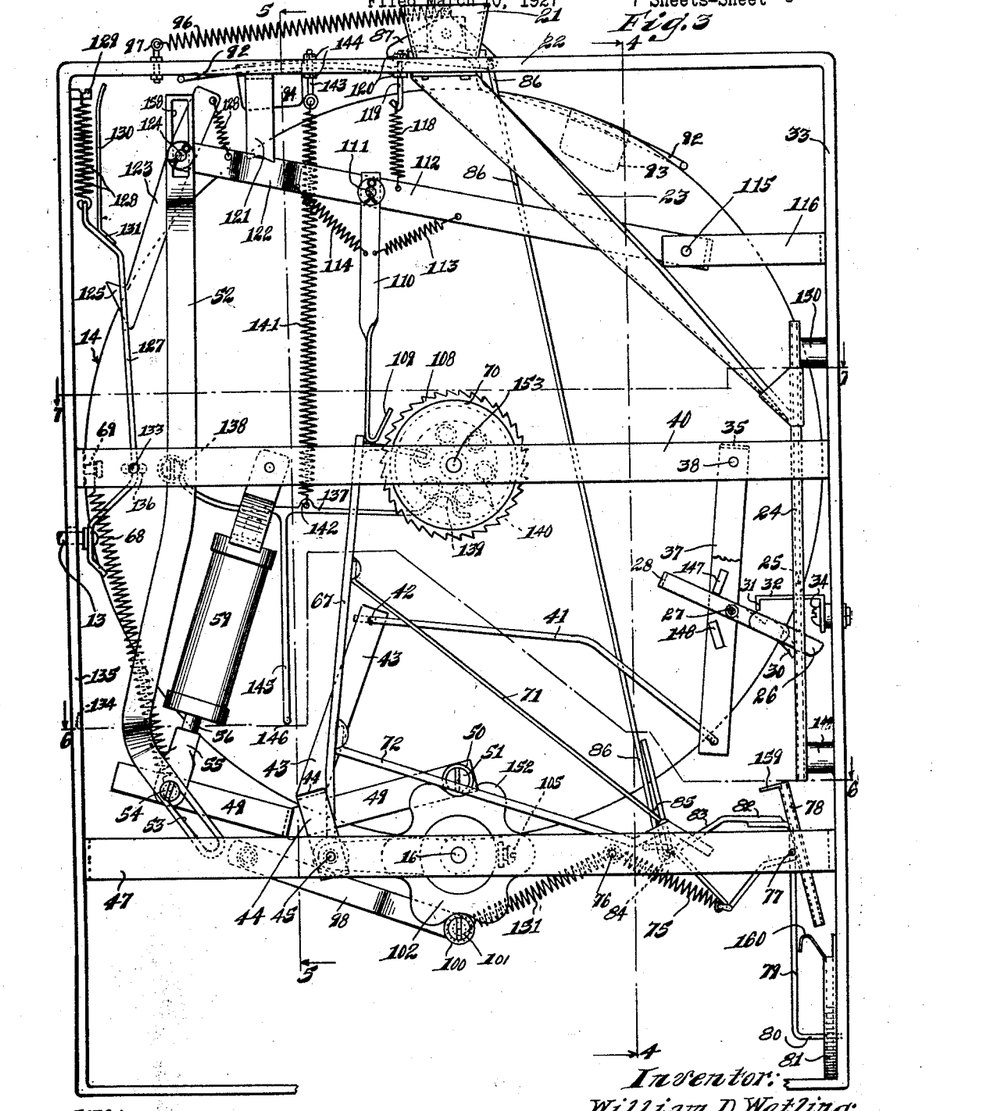
Figure 3 is an elevational view looking in the rear of the device disclosed in Figure 2.
Figure 9:
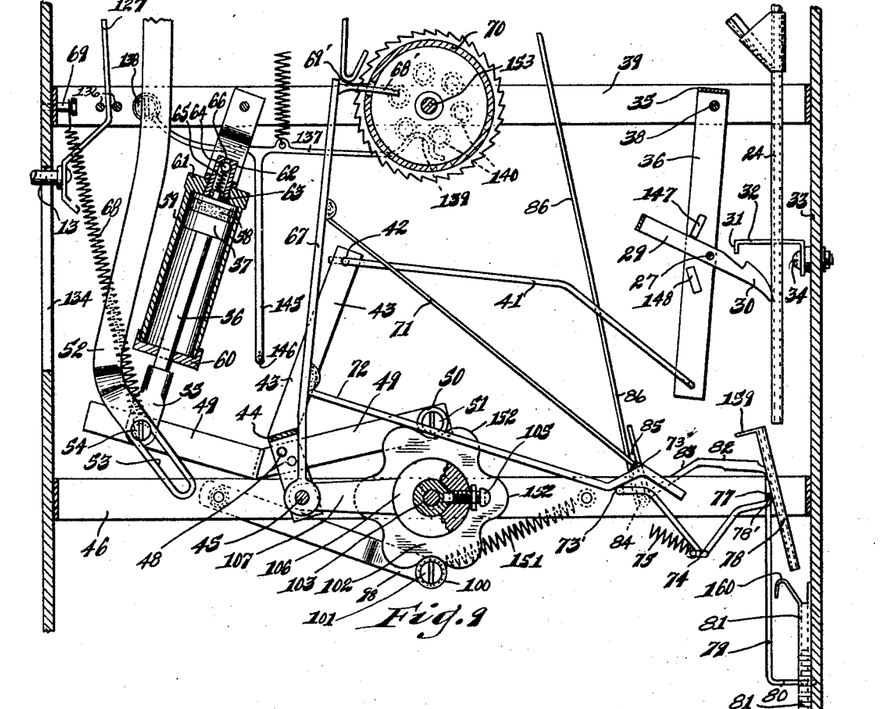
Figure 9 is a sectional view taken on substantially the line 9—9 of Figure 7.

In Figure 3 is shown the coin receiver 21 positioned above the frame 22, and in Figure 1 positioned beneath the coin slot 11. When a coin is dropped into slot 11 it passes down through the receiver 21, through the slide member 23 and into a similar slide 24 to the position shown in Figure 4 in which the coin 25 is resting upon the lever 26, which is pivoted on a cross shaft 27. The member 26 is integral with a member 28 and a similar member 29, which has a hook member 30 near the end for engaging a lug 31 on an arm 32 which is rigidly secured to the side frame member 33 by means of a suitable bolt 34, as best shown in Figure 9. Cross bar 27 is rigidly secured to a U shaped member 35 having downwardly extending arms 36 and 37. Said U shaped member 35 is pivoted on the cross bar 38, which is rigidly secured to the frame members 39 and 40, as shown in Figures 3 and 9. Pivoted to the lower end of member 36 is a wire extension 41, the other end of which passes through a hole 42 in the upper end of an oscillating arm 43 which is rigidly secured to a U shaped member 44 by means of rivets or solder in any suitable manner, and adapted to oscillate with said member 44 which is pivoted on a cross bar 45 extending between frame members 46 and 47. Also, secured to a U shaped member 44 by means of rivets 48 is an arm 49 having a roller 50 secured to one end by means of a bolt 51. The other end of said bar 49 is pivotally secured to an upwardly extending bar 52 which has a slot 53 in the lower end thereof for the purpose of adjustment on the pivot bolt 54. Also, pivoted on bolt 54 is a member 55 which is formed into a piston rod 56, and has any suitable piston and backing secured to the upper end thereof, such as 57 and 58, shown in Figure 9. The piston 57 is positioned within a cylinder 59 having a bottom 60 to limit the extension of said piston rod, and a head 61 to limit the inward movement of said piston rod. In the head 61 is secured a tubular member 62 having a nut 63 secured in the lower end thereof. Positioned between the nut 63 and a ball member 64 is a spring 65 for holding said ball seated against the upper end of member 62. Through the upper end of member 62 is an opening 66 through which air is permitted to slowly escape by said ball 64 when the piston 57 compresses air within the cylinder 59. When the piston 57 moves in the reversed direction air is drawn in through opening 66 and into the cylinder.

Figure 7:
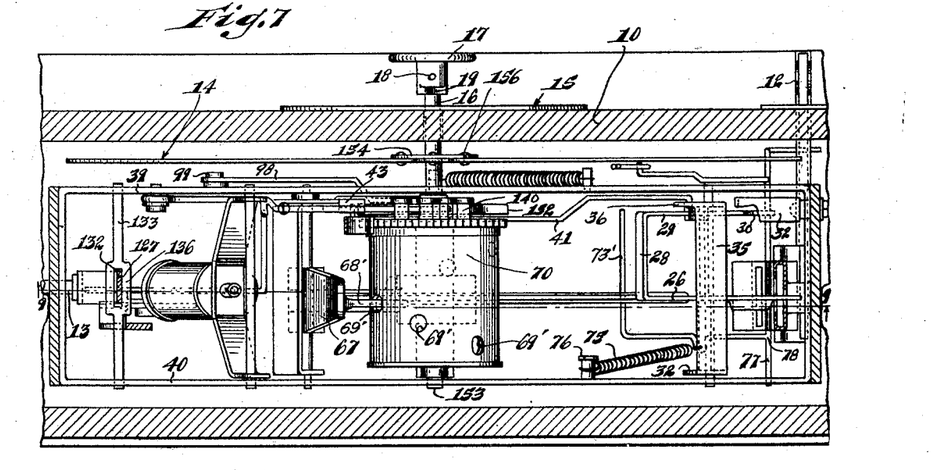
Figure 7 is a cross sectional view taken on approximately the line 7—7 of Figure 3.
Figure 8:
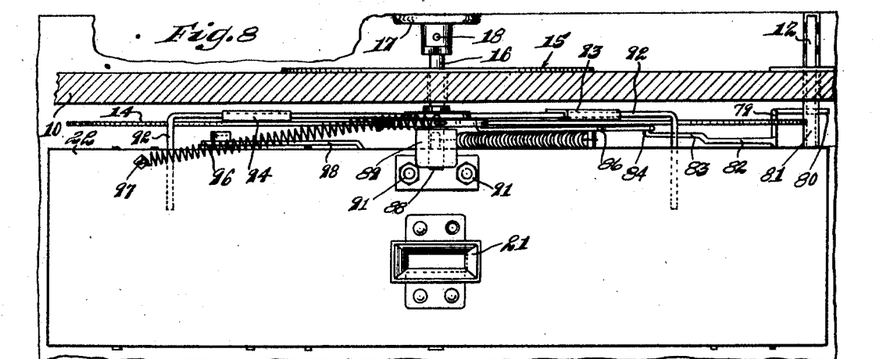
Figure 8 is a cross sectional view taken on approximately the line 8—8 of Figure 1.

Positioned in front of the U shaped member 44 is a bar 67 which is adapted to be engaged by said member 44 and thereby normally pushing said bar 67 forward by means of the coil spring 68, which is secured to a pin 69 at the upper end and to the bolt 54 at the lower end. The bar 67 has a pin 68' secured near the upper end thereof and adapted to extend through openings 69' in a cylinder 70, as shown in Figures 7 and 9. The lower end of bar 67 is pivoted as shown in the cross bar 45. Extending from the face of bar 67 are two members 71 and 72 which are secured together at 73 near their lower extremities, and thereby providing a substantial triangular frame by which the bar 67 is adapted to be oscillated. Engaging under the lower side of member 72 is a cross member 73' which extends downwardly and is formed into an eye member 74, into which the one end of a spring 75 is secured. The other end of spring 75 is secured to a suitable pin 76 on the frame member 47, as best shown in Figure 7. Member 73 extends upwardly from eye member 74 to a cross member 77 to which it is rigidly secured at 78'. Member 77 is rigidly secured to an auxiliary coin slide 78 and is adapted to oscillate the same when spring 75 moves member 73 in an upward direction.

A wire 79 having a lower end portion 80 adapted to pass through the coin slide 81 near the bottom end thereof is welded to member 77 for oscillatory motion therewith, and is also welded at 82 to a wire arm 83 which has a forwardly extending portion 84 passing through a U shaped slot 85 formed by the bending of the signal wire 86, which extends upwardly to a triangular plate 87 which is pivoted on a bolt 88 extending through a casting 89 which is secured to the upper frame member 22 by suitable bolts 91. Securely welded to a triangular plate 87 is a cross wire 92 which has two flags 93 and 94 rigidly secured thereto for indicating to the operator of the machine whether or not the question which was selected on dial 15 is answered in the affirmative. When the reversed side of dial 15 is used, on which I have shown a plurality of race horses, the flags then indicate whether or not the horse which was selected wins the race. Secured through a suitable eye 95 is a coil spring member 96 secured at the other end to a suitable eye 97 for normally drawing the top of said triangular member 87 in the direction in which the spring extends.

A bar member 98 is pivoted on bolt 99 to the frame member 46 and has a roller 100 rotatably mounted on a bolt 101 on the lower end thereof. Said roller 100 is adapted to ride on the lower side of the cam wheel 102 for definitely positioning said cam wheel in one of a plurality of possible positions when said cam wheel is moved by means of knob 17 which rotates shaft 16 in either direction desired. Shaft 16 passes through and is pivotally mounted in frame members 46 and 47 and the cam wheel 102 is tightly pressed onto said shaft between said frame members. Cylinder 103 is integral with member 102 and is provided with a worm slot 104 in which rides the inward end of a set screw 105, as shown in Figures 6 and 9. Said screw 105 has screw thread engagement with a larger cylinder 106 which is loosely fitted over cylinder 103 and adapted to move lengthwise of cylinder 103, when shaft 16 is rotated causing the slot 104 to force the set screw 105 lengthwise of the same, and thereby move member 106, its arm 107, members 71, 72 and the upwardly extending bar 67 crosswise between the frame members 46 and 47 and the pin 68 along the face of cylinder 70, for selecting one of the openings 69 into which said pin 68 is adapted to be inserted when said opening 69 stops at a point beneath the end of said pin.

Integral with the hollow cylinder 70 is a toothed wheel 108 adapted to be engaged by a hook 109 having its shank 110 pivoted on a pin 111 which passes through an arm 112. Hook 109 is yieldingly held in position by coil spring members 113 and 114, the ends of which pass through openings in the shank 110 and the cross bar 112, as best shown in Figure 3. Cross bar 112 is formed into a U shaped member at the lower end, which is pivoted by a pin 115 to a U shaped member 116 secured to the side of the frame member 33. Cross bar 112 is yieldingly held in elevated position by means of a coil spring 118 hooked over the curved end of a bolt 119, held by nuts 120 to the upper frame member 22.

Figure 2:
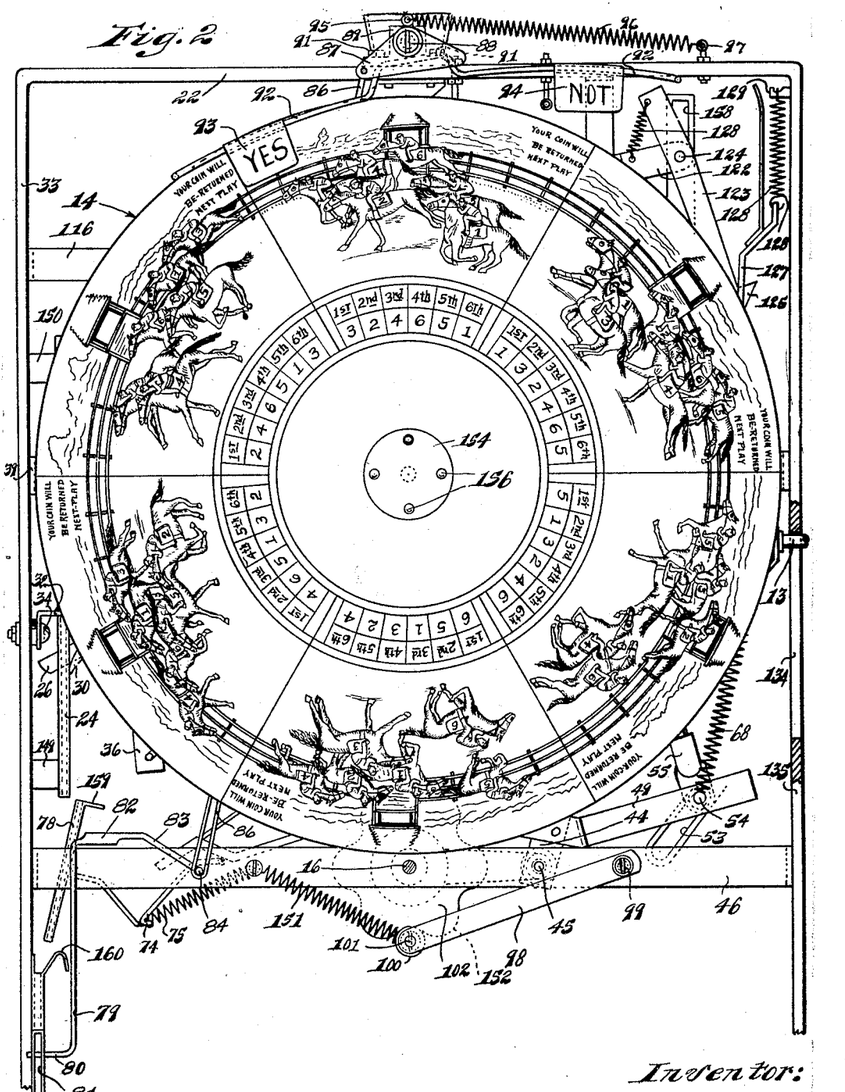
Figure 2 is a front elevational view similar to Figure 1 except that the outer cabinet has been removed.
Figure 5:
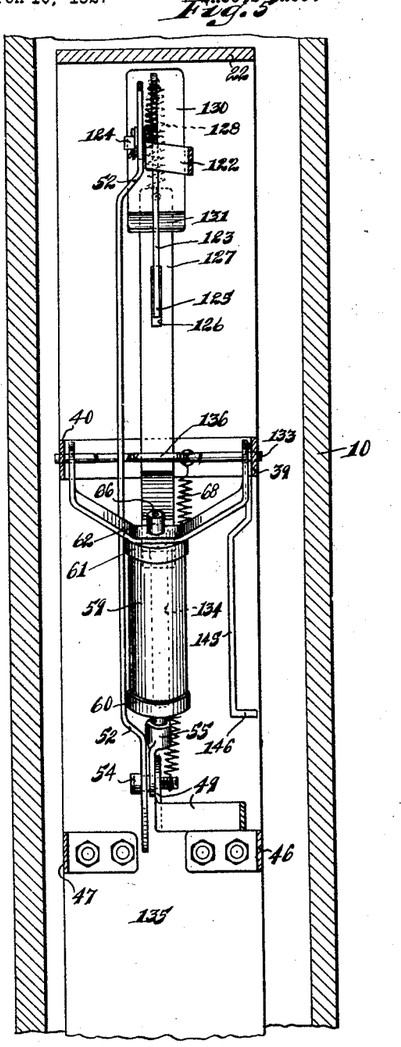
Figure 5 is an elevational sectional view taken on approximately the line 5—5 of Figure 3.

The free end of bar 112 is bent sidewise at 122 and passes under a stop plug 121 suitably secured to the top frame 22 for limiting the upward movement of said bar. To the extreme end of said bar 112 is pivoted a hook lever 123 by bolt 124, and having a hook 125 normally held in slot 126 in a slidable member 127, by means of a coil spring 128 secured between the upper end of the hook lever 123 and the bar member 112 as shown in Figures 2, 3 and 5. The slidable member 127 is suspended by a coil spring 128 from a suitable lug 129. A sheet metal guard member 130 is welded to member 127 at a point 131 for the purpose of protecting the spring from damage, which might result from engagement with hook 125, if it were not protected.

The member 127 is slidably guided through an opening 132 in a divided cross member 133, and near the lower end of the slidable member 127 is secured the operating handle 13, operable in the slot 134 in the side frame member 135. When the handle 13 is depressed the member 127 is drawn downwardly, it thereby pulls hook 125 along with it to the cross member 133 where it is tripped from engagement with member 127 by the inner side 136 of the divided member 133.

A stiff wire member 137 is pivoted to the frame member 39 by a bolt 138, and the opposite end thereof is curved as shown at 139, and is held into frictional engagement with one or more of the rigid pin members 140, by a coil spring 141 secured to member 137 through a lug 142, and to the top frame member 22 by a bolt 143 having nuts 144 thereon. On the lower side of member 137 is a depending member 145 which has an end portion 146, bent sidewise and adapted to be engaged by the rear side of member 43 when the same is drawn rearwardly by pivoted movement on the cross shaft 45.

The coin controlled member 29 is limited in its oscillatory movement by suitable locks 147 and 148 on the arm 36 of the U shaped member 35. The coin slot 24 is suitably held in a vertical position by lug members 149 and 150 (Figure 3). The roller 100 is normally held in engagement with the lower side of the cam wheel 102 by a suitable spring 151, and said roller may cause arm 98 to oscillate when the roller is moved by means of the rotation of said cam wheel, having a plurality of cam projections 152 thereon.

Figure 10:
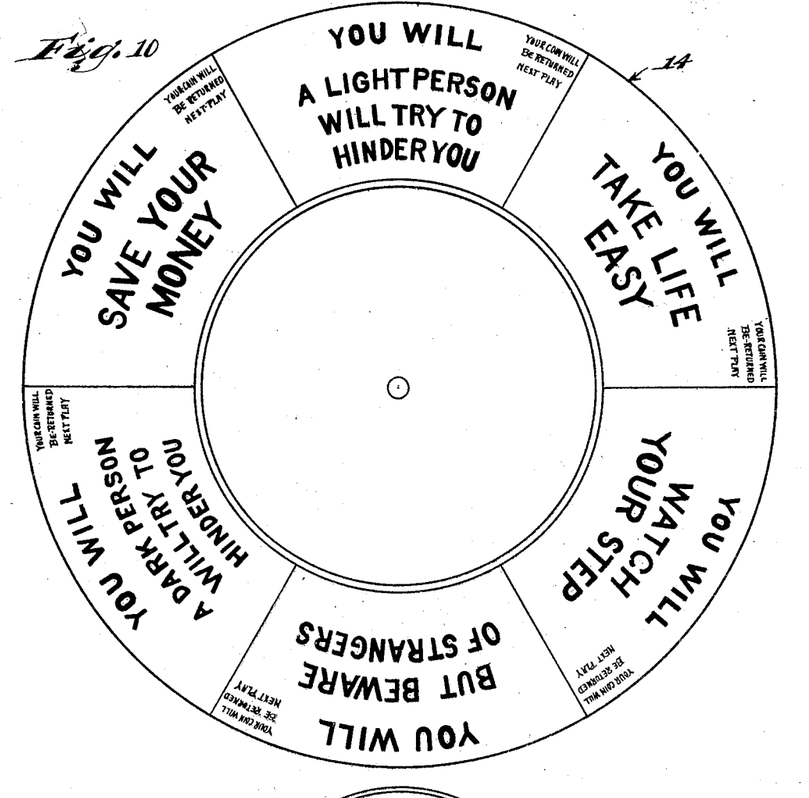
Figure 10 is a view of the reversed side of the dial shown in Figure 2.

On the front end of the cross shaft 153 is secured a flange member 154 which is bolted to a metal disk 14 by bolts 156 for causing said disk 14 to rotate with the shaft 153 and the hollow cylinder 70. The disk 14 has answers to questions on one side, to be used with the questions on the one side of disk 15 as shown in Figures 10 and 11. On the other side of disk 14 are six groups of six racing objects, and for the purpose of illustration I have chosen horses, but any other movable objects could be used. Each group of horses is arranged differently so that there are different combinations. The combinations are so arranged that in the six groups horse Number 1 is in first place in one group, second place in another, third in another and so on to the sixth place and likewise with each of the other horses from Number 2 to Number 6 inclusive, and their relative position is indicated by the numbers below the groups of horses; the top row of numbers designates the place or relative position, whereas the row directly beneath designates the horse which is in that particular place with respect to the others. Near the bottom of Figure 1 is shown the disk 15 showing side forward which has horses thereon and adapted to be used together with a side of disk 14 shown in Figure 2 and at the top of Figure 1.

Figure 4:
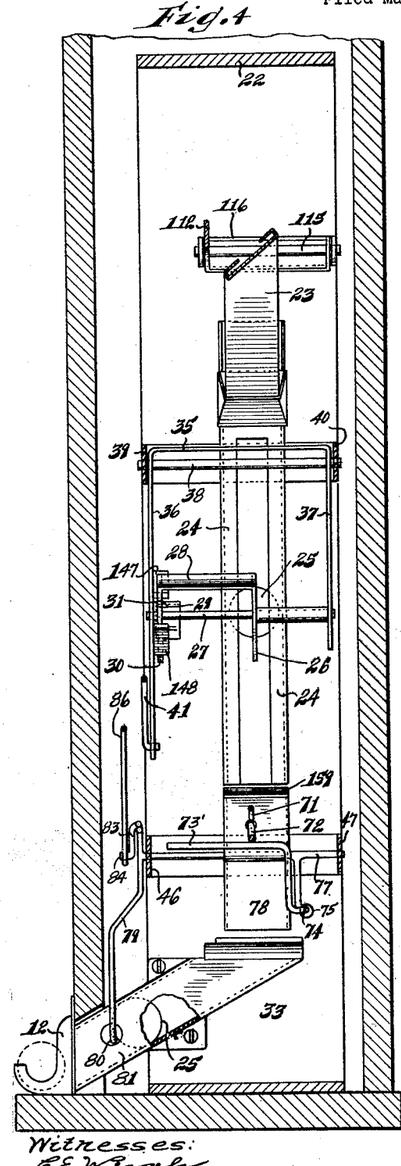
Figure 4 is an elevational sectional view taken on approximately line 4—4 of Figure 3.

In operation my amusement device functions as follows:

A coin is dropped in the coin slot 11 and it slides downwardly through slots 23 and 24 into the position where it is shown as in Figure 4. In this position the coin 25 rests on the arm 26 of the U-shaped member 28 and causes the hook member 30 to become disengaged from hook 31, and arm 29 is thereby elevated into engagement with lug 147 as shown in Figure 9. The device is now in condition to be operated by the downward movement of handle 13 which draws the sliding bar 127 downward and the hook lever together with members 52 and 112. As the bar 112 is drawn downward the hook lever 110 slides downwardly over the ends of teeth 108 on the disk 70 and is caused to engage beneath one of said teeth by means of the stress of spring 113. When lever 13 has reached approximately the bottom of slot 134, the front portion 136 of the divided cross bar 133 is forced in between the hook lever 123 and the sliding member 127 so as to force the hook 125 from engagement with member 127, and springs 118 and 67 cause the various members to return to their normal position, and in so doing hook 109 in engagement with teeth 108 causes the cylinder 70 and the disk 14 to rotate.

When the bar 52 was in the lowered position it forced the plunger 56 outwardly from the cylinder 59, and the member 43 being pivoted at 45 rocked backwardly into engagement with the portion 146 of depending member 145, and thereby caused member 137 to be drawn downwardly about its pivot 138 and the curved portion 139 was thereby drawn out of engagement with pins 140, allowing free rotation of the cylinder 70.

The bar 52 is provided with slots 53 and 158 so as to allow member 112 to return suddenly to its upward position thereby giving rapid rotation to cylinder 70. The member 137, having a curved portion 139 thereon which is adapted to act as a brake on pins 140 of the cylinder 70, is slowly returned to its normal position because it is held from rapid movement by means of bar 43 in engagement with member 146, and as bar 43 is welded to the bar 49, both of them are pivoted about the same shaft 45 and the upward movement of bar 49 is retarded by the compression of air in cylinder 59 by piston 57. After the air has had time to leak out of the cylinder 59 the bar 49 has assumed its normal position and bar 137 has been released from engagement with bar 43, and the curved portion 139 frictionally engaged pins 140 and caused the cylinder 70 and the disk 14 to stop rotation at one of six possible positions as the member 139 positions itself partially between two of the pins 140 as shown in Figure 9.

When the cylinder 70 stops, as explained, it will have stopped in one of six possible positions, and in the illustration shown in Figure 9 the cylinder stopped in such a position as to allow pin 68' on the end of bar 67 to pass inwardly through an opening 69' into said hollow cylinder. When the handle 13 was forced downwardly it rotated bar 43 on the axis 45, as explained, and the wire 41 caused the U shaped member 36 to be drawn inwardly sufficiently to allow the coin 25 to pass by the end of arm 26, and as the bar 43 rotated, as explained, it allowed bar 67 to rotate on its axis and raise the member 72 so as to clear member 73 from engagement therewith, and spring 75 caused member 73 to rotate on its axis 77 and thereby positioning the lip 159 of the coin slot 78 directly beneath the end of slot 24 so as to receive the coin as it slipped by the end of arm 26.

As the mechanism assumes its normal position the slot 78 assumes a vertical position beneath the end of slot 24 so that the coin is free to slide down through said slot 78 onto the lip 160 of the lower coin slot 81, and when the pin 68' passes into the cylinder 70 the member 72 rotates member 73 downwardly on its pivot 77 and tilts the coin slot 78 sidewise into the position shown in Figure 9, and allows the coin to slip into the lower slot 81, but the arm 79 having the extension 80 thereon obstructs the slot 81 so that the coin is prevented from sliding down into the coin return member 12 until the next operation of the amusement device.

When member 78 rotates on its axis 77 to the position shown in Figure 9, the members 79 and 83 also rotate about the axis 77 and as member 83 is in engagement with the lower end of member 86 it pulls downwardly on the same, thereby rotating the triangular plate 87 about its axis 88 against the resistance of spring 96 and presents to view the metal flag marked "Yes" as shown in Figures 1 and 2 and the flag marked "Not" being positioned on the same cross member 92 is caused to be lifted from its normal position over the words on the disk "Your coin will be returned next play," thereby notifying the player that he will receive his coin when the device is again operated.

When the device is again operated by means of handle 13, the member 72 is lifted, as previously described, which allows member 79 to rotate on the axis 77 and releases the coin which it is holding back in slot 81, and the coin is received in the member 12 shown in Figure 1. At the same time the coin which has been used for playing the device this time has fallen downwardly onto the lip 159 and, as previously described, downwardly through slot 78 onto the top of lip 160, and in case the pin 68 engages the side of cylinder 70 instead of passing through an opening 69 the member 78 is rotated just sufficiently to assume a vertical position beneath slot 24 and the coin remains positioned on the edge of lip 160, but does not pass downwardly into slot 81.

When held in this position the spring 96 rotates the triangular plate 78 about its axis sufficiently to withdraw the "Yes" flag from exposure to the operator's view and drops the "Not" flag over the words "Your coin will be returned next play," thereby showing the operator that his question has been answered in the negative, and that he will not receive his coin on the next play, or if the dials shown in Figure 1 happen to be used it indicates that the horse selected by the pointer 19 has not won the race.

For the purpose of selecting a question to be answered or a horse to win the race, it is necessary to rotate knob 17 and the pointer 19 which rotates the cam wheel 102 causing one of the cams thereon to lift the arm 49 and rotate the arm 43 on its axis, which allows the member 72 to be lifted and which in turn allows spring 75 to rotate coin slot 78 on its axis and drop the coin, which is held on lip 160, into a coin box which would be positioned at any suitable point within the cabinet. When the knob 17 is rotated it causes the set screw 105 to force the cylinder 106 lengthwise of cylinder 103, together with the arm 107 which moves arm 67 and pin 68 in the same direction, thereby setting the pin 68 at any desired point along the side of cylinder 70, and thereby selecting an opening into which the slot 68 is adapted to pass in case the cylinder stops in a position with said opening beneath the end of the pin 68, and by this means the horse which wins the race is selected when the cylinder stops so as to permit the pin 68 to pass into one of the openings 69, but if the cylinder does not stop in that position the horse selected did not win the race.

As has been hereinbefore explained, the disk 14 may be positioned in such a way as to expose either side to the operator and the corresponding side of disk 15 should also be used, and in this way it is obvious that my invention may be operated either as a fortune telling machine or a racing machine.

While I have described my invention in its preferred form, it is capable of variations without departing from the spirit of the invention, and, therefore, I do not wish to be limited to the precise details of construction set forth, but desire to avail myself of such variations and modifications as come within the scope of the appended claims.

I claim as my invention:

1. A device of the class described adapted to be operated as a fortune telling machine having operating means therefor; means for selecting a question to be answered; means for answering said question upon the operation of said device; coin controlled locking means for said operating means, and means for indicating to the operator that his coin will be returned on the next play.

2. A device of the class described having means for selecting a question to be answered on the operation of said device; operating means therefor; coin controlled locking means for said operating means; said selecting means comprising a knob and a pointer connected to a shaft and a disk with questions thereon; a cam wheel and a spirally slotted cylinder, a second cylinder positioned around the first cylinder; means on said second cylinder adapted to slide in said spiral slot for moving said second cylinder lengthwise of said first cylinder and means operable by said second cylinder for passing through an opening in a third cylinder for causing the question selected to be answered in the affirmative; said cam wheel cooperating with said selecting means; cams on said cam wheel adapted to oscillate a roller operated bar, positioned beneath said cam wheel for positively positioning said selecting means in one of a plurality of operable positions.

3. A device of the class described comprising a dial with a plurality of racing objects thereon; means for selecting one of said objects to win the race; a second and larger dial having a plurality of groups of said racing objects; said objects being arranged in different combinations in each group; operating means for causing said second dial to rotate; coin controlled locking means for said operating means; means for stopping said rotation; means to indicate whether or not the object selected won the race, and tabulated means for indicating the relative places of said objects at the end of the race.

4. An amusement device comprising a rotatable dial mounted on a shaft, journaled in frame members; a hollow cylinder mounted on said shaft and having openings through the curved surface thereof and adapted to have a pin pass inwardly through the same; a pin movable along the surface of said cylinder for passing through said holes; means for moving said pin, for selecting an object to win a race; groups of racing objects on said rotatable dial, means for rotating said dial; coin controlled locking means for preventing the rotation of said dial, and means for indicating the relative places of said objects at the end of the race.

5. An amusement device comprising a rotatable dial with a plurality of groups of differently arranged racing objects thereon; means for selecting one of said objects to win the race; operating means for rotating said dial; coin controlled locking means for said operating means, and means for indicating the relative position of said objects at the end of the race.

6. An amusement device comprising a rotatable dial with a plurality of groups of differently arranged racing objects thereon; means for selecting one of said objects to win the race; means for rotating said dial; coin controlled locking means for said dial rotating means, and means for indicating the relative position of said objects at the end of the race; said indicating means comprising a row of numbers in order, below each group of objects, for indicating relative places, and a second row of numbers indicating which object corresponds with each place.

7. An amusement device comprising a rotatable dial with a plurality of groups of differently arranged racing objects thereon; means for selecting one of said objects to win the race; means for rotating said dial; coin controlled locking means therefor; means for indicating the relative position of said objects at the end of the race; said selecting means comprising two cylinders adapted to be moved endwise with respect to each other, by means of a set screw in one and extending into a spiral slot in the other; an arm on one of said cylindrical members adapted to move a slidable bar parallel with the movement of said cylinder; means on said slidable bar for engaging the curved surface of a third cylinder; said third cylinder having perforations therethrough; one of said perforations being adapted to receive said engaging means when the object selected has won the race.

8. An amusement device comprising a rotatable dial with a plurality of groups of differently arranged racing objects thereon; means for selecting one of said objects to win the race; means for rotating said dial; coin controlled locking means therefor; means for indicating the relative position of said objects at the end of the race; a plurality of coin slots adapted to cooperate; one of said slots being movable on a transverse axis; means for oscillating said slot on said axis for causing said slot to deposit a coin into either of a plurality of places, depending on whether or not the object selected has won the race.

9. An amusement device comprising a rotatable dial with a plurality of groups of differently arranged racing objects thereon; means for selecting one of said objects to win the race; means for rotating said dial; coin controlled locking means therefor; means for indicating the relative position of said objects at the end of the race; a second dial on said device and a pointer for disclosing to the operator which one of said plurality of objects has been selected.

10. An amusement device comprising a rotatable dial with a plurality of groups of differently arranged racing objects thereon; means for selecting one of said objects to win the race; means for rotating said dial; coin controlled locking means therefor; means for indicating the relative position of said objects at the end of the race; a cam wheel cooperating with said selecting means; cams on said cam wheel adapted to oscillate a roller operated bar, positioned beneath said cam wheel for positively positioning said selecting means in one of a plurality of operable positions.

11. An amusement device comprising a rotatable dial with a plurality of groups of differently arranged racing objects thereon; means for selecting one of said objects to win the race; means for rotating said dial; coin controlled locking means therefor; means for indicating the relative position of said objects at the end of the race; a cam wheel cooperating with said selecting means; cams on said cam wheel adapted to oscillate a roller operated bar, positioned beneath said cam wheel for positively positioning said selecting means in one of a plurality of operable positions; said cams adapted to oscillate another oscillatory member for permitting the selecting means to be operated.

12. An amusement device comprising a rotatable dial with a plurality of groups of differently arranged racing objects thereon; means for selecting one of said objects to win the race; means for rotating said dial; coin controlled locking means therefor; means for indicating the relative position of said objects at the end of the race; said indicating means comprising a row of numbers in order, below each group of objects, for indicating relative places, and a second row of numbers indicating which object corresponds with each place; said selecting means comprising two cylinders adapted to be moved endwise with respect to each other by means of a set screw in one and extending into a spiral slot in the other; an arm on one of said cylindrical members adapted to move a slidable bar parallel with the movement of said cylinder; means on said slidable bar for engaging the curved face of a third cylinder; said third cylinder having perforations therethrough; one of said perforations being adapted to receive said engaging means when the object selected wins the race.

13. An amusement device comprising a rotatable dial with a plurality of groups of differently arranged racing objects thereon; means for selecting one of said objects to win the race; means for rotating said dial; coin controlled locking means therefor; means for indicating the relative position of said objects at the end of the race; said indicating means comprising a row of numbers in order, below each group of objects, for indicating relative places, and a second row of numbers indicating which object corresponds with each place; said selecting means comprising two cylinders adapted to be moved endwise with respect to each other by means of a set screw in one and extending into a spiral slot in the other; an arm on one of said cylindrical members adapted to move a slidable bar parallel with the movement of said cylinder; means on said slidable bar for engaging the curved face of a third cylinder; said third cylinder having perforations therethrough; one of said perforations being adapted to receive said engaging means when the object selected wins the race; a plurality of coin slots adapted to cooperate; one of said slots being movable on a transverse axis; means for oscillating said slot on its axis for causing said slot to deposit a coin into one of a plurality of places, depending on whether or not the object selected wins the race.

14. An amusement device comprising a rotatable dial with a plurality of groups of differently arranged racing objects thereon; means for selecting one of said objects to win the race; means for rotating said dial; coin controlled locking means therefor; means for indicating the relative position of said objects at the end of the race; said indicating means comprising a row of numbers in order, below each group of objects, for indicating relative places, and a second row of numbers indicating which object corresponds with each place; a plurality of coin slots adapted to cooperate; one of said slots being movable on a transverse axis; means for oscillating said slot on its axis for causing said slot to deposit a coin into one of a plurality of places, depending on whether or not the object selected wins the race.

15. An amusement device comprising a rotatable dial with a plurality of groups of differently arranged racing objects thereon; means for selecting one of said objects to win the race; means for rotating said dial; coin controlled locking means therefor; means for indicating the relative position of said objects at the end of the race; said indicating means comprising a row of numbers in order, below each group of objects, for indicating relative places, and a second row of numbers indicating which object corresponds with each place; a second dial on said device and a pointer for disclosing to the operator which one of said plurality of objects has been selected.

16. An amusement device comprising a rotatable dial with a plurality of groups of differently arranged racing objects thereon; means for selecting one of said objects to win the race; means for rotating said dial; coin controlled locking means therefor; means for indicating the relative position of said objects at the end of the race; said indicating means comprising a row of numbers in order, below each group of objects, for indicating relative places, and a second row of numbers indicating which object corresponds with each place; a cam wheel cooperating with said selecting means; cams on said cam wheel adapted to oscillate a roller operated bar, positioned beneath said cam wheel for positively positioning said selecting means in one of a plurality of operable positions.

17. An amusement device comprising a rotatable dial with a plurality of groups of differently arranged racing objects thereon; means for selecting one of said objects to win the race; means for rotating said dial; coin controlled locking means therefor; means for indicating the relative position of said objects at the end of the race; said indicating means comprising a row of numbers in order, below each group of objects, for indicating relative places, and a second row of numbers indicating which object corresponds with each place; a cam wheel cooperating with said selecting means; cams on said cam wheel adapted to oscillate a roller operated bar, positioned beneath said cam wheel for positively positioning said selecting means in one of a plurality of operable positions; said cams adapted to oscillate another oscillatory member for permitting the selecting means to be operated.

18. An amusement device comprising a rotatable dial with a plurality of groups of differently arranged racing objects thereon; means for selecting one of said objects to win the race; means for rotating said dial; coin controlled locking means therefor; means for indicating the relative position of said objects at the end of the race; said selecting means comprising two cylinders adapted to be moved endwise with respect to each other, by means of a set screw in one and extending into a spiral slot in the other; an arm on one of said cylindrical members adapted to move a slidable bar parallel with the movement of said cylinder; means on said slidable bar for engaging the curved surface of a third cylinder; said third cylinder having perforations therethrough; one of said perforations being adapted to receive said engaging means when the object selected has won the race; a plurality of coin slots adapted to cooperate; one of said slots being movable on a transverse axis; means for oscillating said slot on its axis for causing said slot to deposit a coin into one of a plurality of places, depending on whether or not the object selected wins the race.

19. An amusement device comprising a rotatable dial with a plurality of groups of differently arranged racing objects thereon; means for selecting one of said objects to win the race; means for rotating said dial; coin controlled locking means therefor; means for indicating the relative position of said objects at the end of the race; said selecting means comprising two cylinders adapted to be moved endwise with respect to each other, by means of a set screw in one and extending into a spiral slot in the other; an arm on one of said cylindrical members adapted to move a slidable bar parallel with the movement of said cylinder; means on said slidable bar for engaging the curved surface of a third cylinder; said third cylinder having perforations therethrough; one of said perforations being adapted to receive said engaging means when the object selected has won the race; a second dial on said device and a pointer for disclosing to the operator which one of said plurality of objects has been selected.

20. An amusement device comprising a rotatable dial with a plurality of groups of differently arranged racing objects thereon; means for selecting one of said objects to win the race; means for rotating said dial; coin controlled locking means therefor; means for indicating the relative position of said objects at the end of the race; said selecting means comprising two cylinders adapted to be moved endwise with respect to each other, by means of a set screw in one and extending into a spiral slot in the other; an arm on one of said cylindrical members adapted to move a slidable bar parallel with the movement of said cylinder; means on said slidable bar for engaging the curved surface of a third cylinder; said third cylinder having perforations therethrough; one of said perforations being adapted to receive said engaging means when the object selected has won the race; a cam wheel cooperating with said selected means, cams on said cam wheel adapted to oscillate a roller operated bar, positioned beneath said cam wheel for positively positioning said selecting means in one of a plurality of operable positions.

21. An amusement device comprising a rotatable dial with a plurality of groups of differently arranged racing objects thereon; means for selecting one of said objects to win the race; means for rotating said dial; coin controlled locking means therefor; means for indicating the relative position of said objects at the end of the race; said selecting means comprising two cylinders adapted to be moved endwise with respect to each other, by means of a set screw in one and extending into a spiral slot in the other; an arm on one of said cylindrical members adapted to move a slidable bar parallel with the movement of said cylinder; means on said slidable bar for engaging the curved surface of a third cylinder; said third cylinder having perforations therethrough; one of said perforations being adapted to receive said engaging means when the object selected has won the race; a cam wheel cooperating with said selected means, cams on said cam wheel adapted to oscillate a roller operated bar, positioned beneath said cam wheel for positively positioning said selecting means in one of a plurality of operable positions; said cams adapted to oscillate another oscillatory member for permitting the selecting means to be operated.

22. An amusement device comprising a rotatable dial with a plurality of groups of differently arranged racing objects thereon; means for selecting one of said objects to win the race; means for rotating said dial; coin controlled locking means therefor; means for indicating the relative position of said objects at the end of the race; a plurality of coin slots adapted to cooperate; one of said slots being movable on a transverse axis; means for oscillating said slot on said axis for causing said slot to deposit a coin into either of a plurality of places, depending on whether or not the object selected has won the race; a second dial on said device and a pointer for disclosing to the operator which one of said plurality of objects has been selected.

23. An amusement device comprising a rotatable dial with a plurality of groups of differently arranged racing objects thereon; means for selecting one of said objects to win the race; means for rotating said dial; coin controlled locking means therefor; means for indicating the relative position of said objects at the end of the race; a plurality of coin slots adapted to cooperate; one of said slots being movable on a transverse axis; means for oscillating said slot on said axis for causing said slot to deposit a coin into either of a plurality of places, depending on whether or not the object selected has won the race; a cam wheel cooperating with said selecting means; cams on said cam wheel adapted to oscillate a roller operated bar, positioned beneath said cam wheel, for positively positioning said selecting means in one of a plurality of operable positions.

24. An amusement device comprising a rotatable dial with a plurality of groups of differently arranged racing objects thereon; means for selecting one of said objects to win the race; means for rotating said dial; coin controlled locking means therefor; means for indicating the relative position of said objects at the end of the race; a plurality of coin slots adapted to cooperate; one of said slots being movable on a transverse axis; means for oscillating said slot on said axis for causing said slot to deposit a coin into either of a plurality of places, depending on whether or not the object selected has won the race; a cam wheel cooperating with said selecting means; cams on said cam wheel adapted to oscillate a roller operated bar positioned beneath said cam wheel, for positively positioning said selecting means in one of a plurality of operable positions; said cams adapted to oscillate another oscillatory member, for permitting the selecting means to be operated.

25. An amusement device comprising a rotatable dial with a plurality of groups of differently arranged racing objects thereon; means for selecting one of said objects to win the race; means for rotating said dial; coin controlled locking means therefor; means for indicating the relative position of said objects at the end of the race; a second dial on said device and a pointer for disclosing to the operator which one of said plurality of objects has been selected; a cam wheel cooperating with said selecting means; cams on said cam wheel adapted to oscillate a roller operated bar, positioned beneath said cam wheel for positively positioning said selecting means and one of a plurality of operable positions.

26. An amusement device comprising a rotatable dial with a plurality of groups of differently arranged racing objects thereon; means for selecting one of said objects to win the race; means for rotating said dial; coin controlled locking means therefor; means for indicating the relative position of said objects at the end of the race; a second dial on said device and a pointer for disclosing to the operator which one of said plurality of objects has been selected; a cam wheel cooperating with said selecting means; cams on said cam wheel adapted to oscillate a roller operated bar, positioned beneath said cam wheel for positively positioning said selecting means and one of a plurality of operable positions; said cams adapted to oscillate another oscillatory member, for permitting the selecting means to be operated.

27. An amusement device comprising a rotatable dial with a plurality of groups of differently arranged racing objects thereon; means for selecting one of said objects to win the race; means for rotating said dial; coin controlled locking means therefor; means for indicating the relative position of said objects at the end of the race; said indicating means comprising a row of numbers in order, below each group of objects, for indicating relative places, and a second row of numbers indicating which object corresponds with each place; said selecting means comprising two cylinders adapted to be moved endwise with respect to each other by means of a set screw in one and extending into a spiral slot in the other; an arm on one of said cylindrical members adapted to move a slidable bar parallel with the movement of said cylinder; means on said slidable bar for engaging the curved face of a third cylinder; said third cylinder having perforations therethrough; one of said perforations being adapted to receive said engaging means when the object selected wins the race; a plurality of coin slots adapted to cooperate; one of said slots being movable on a transverse axis; means for oscillating said slot on its axis for causing said slot to deposit a coin into one of a plurality of places, depending on whether or not the object selected wins the race; a second dial on said device, cooperating with the pointer, for disclosing to the operator which one of said plurality of objects has been selected; a cam wheel cooperating with said selecting means; cams on said cam wheel adapted to oscillate a roller operated bar, positioned beneath said cam wheel, for positively positioning said selecting means in one of a plurality of operable positions; said cams adapted to oscillate another oscillatory member for permitting the selecting means to be operated.

28. An amusement device comprising a rotatable dial with a plurality of groups of differently arranged racing objects thereon; means for selecting one of said objects to win the race; means for rotating said dial; coin controlled locking means therefor; means for indicating the relative position of said objects at the end of the race; means for indicating to the operator that his coin will be returned on the next play; means for restraining the coin from being returned until the device is again operated, and spring operated means for releasing said restraining means on the next operation of said device.

In testimony whereof I have signed my name to this specification.

WILLIAM D. WATLING.